(12) United States Patent
Yamamoto et al.

(10) Patent No.: US 9,203,224 B2
(45) Date of Patent: Dec. 1, 2015

(54) ELECTRICAL JUNCTION BOX

(71) Applicant: Yazaki Corporation, Tokyo (JP)

(72) Inventors: Masaki Yamamoto, Makinohara (JP); Kazutoshi Kurachi, Makinohara (JP); Kei Tomita, Makinohara (JP); Taisuke Tomita, Hamamatsu (JP); Takayoshi Marui, Hamamatsu (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/420,446

(22) PCT Filed: Aug. 21, 2013

(86) PCT No.: PCT/JP2013/072239
§ 371 (c)(1),
(2) Date: Feb. 9, 2015

(87) PCT Pub. No.: WO2014/030660
PCT Pub. Date: Feb. 27, 2014

(65) Prior Publication Data
US 2015/0236489 A1 Aug. 20, 2015

(30) Foreign Application Priority Data

Aug. 22, 2012 (JP) ................ 2012-182963

(51) Int. Cl.
*H05K 5/00* (2006.01)
*H02G 3/16* (2006.01)
*H01R 4/22* (2006.01)
(52) U.S. Cl.
CPC ... *H02G 3/16* (2013.01); *H01R 4/22* (2013.01)
(58) Field of Classification Search
CPC .................................. H01R 4/22; H02G 3/16
USPC ........................................................ 439/76.2
See application file for complete search history.

(56) References Cited

U.S. PATENT DOCUMENTS 5,587,556 A * 12/1996 Yamamoto et al. ...... H01R 4/22
174/138 F
5,747,737 A * 5/1998 Waehner .................. H02G 3/16
174/59

(Continued)

FOREIGN PATENT DOCUMENTS

| JP | 2004-088946 A | 3/2004 |
| JP | 2010-136570 A | 6/2010 |
| JP | 2012-085431 A | 4/2012 |

OTHER PUBLICATIONS

International Search Report of PCT/JP2013/072239 dated Sep. 24, 2013.

*Primary Examiner* — Hung V Ngo
(74) *Attorney, Agent, or Firm* — Sughrue Mion, PLLC

(57) ABSTRACT

Provided is an electrical junction box which prevents a bonder cap from falling out of a bonder cap accommodating part without using a bundling tie. The electrical junction box includes a frame having a bonder cap accommodating part and a terminal-attached wire accommodating part, and a cover. An edge forming an insertion port of the bonder cap accommodating part includes a low profile portion with the same height as that of an edge of the terminal-attached wire accommodating part and a projecting portion projecting beyond the low profile portion. In a state where the cover is attached to the frame, a distance between the low profile portion and the cover is longer than the full length of the bonder cap, and a distance between the most projected portion of the projecting portion and the cover is shorter than the full length of the bonder cap. The wire bundle outside the bonder cap accommodating part is bent toward the low profile portion.

2 Claims, 4 Drawing Sheets

(56) References Cited

U.S. PATENT DOCUMENTS

| | | | | |
|---|---|---|---|---|
| 6,172,300 B1 * | 1/2001 | Kawaguchi | H01R 4/22 174/135 |
| 6,527,571 B2 * | 3/2003 | Muta et al. | H01R 4/4809 439/246 |
| 8,338,708 B2 * | 12/2012 | Maebashi et al. | H01R 4/22 174/87 |
| 2003/0017727 A1 * | 1/2003 | Seo et al. | H05K 7/026 439/76.2 |
| 2005/0208793 A1 * | 9/2005 | Takeuchi | H01R 13/518 439/76.2 |
| 2009/0221160 A1 * | 9/2009 | Taniguchi et al. | H02G 3/083 439/76.2 |
| 2010/0144170 A1 | 6/2010 | Maebashi et al. | |

* cited by examiner

ELECTRICAL JUNCTION BOX

CROSS REFERENCE TO RELATED APPLICATIONS

This is a National Stage of International Application No. PCT/JP2013/072239 filed Aug. 21, 2013, claiming priority based on Japanese Patent Application No. 2012-182963 filed Aug. 22, 2012, the contents of all of which are incorporated herein by reference in their entirety.

TECHNICAL FIELD

The present invention relates to an electrical junction box having a frame with a bonder cap accommodating part and a terminal-attached wire accommodating part.

BACKGROUND ART

There are various structures for an electrical junction box for automobiles, for example, one including a frame having a bonder cap accommodating part and a terminal-attached wire accommodating part (refer to Patent Literature 1). FIG. 4 is a perspective view of a frame used in conventional electrical junction boxes. In the figure, a bonder cap is press-fitted into a bonder cap accommodating part of the frame. FIG. 5 is a perspective view only showing the frame of FIG. 4.

As shown in FIGS. 4 and 5, the frame 302 is formed of synthetic rubber and has the bonder cap accommodating part 306 into which the bonder cap 5 is press-fitted, a terminal-attached wire accommodating part 307 into which a terminal-attached wire is inserted, and a threading hole 309 through which a bundling tie 308 passes. FIGS. 4 and 5 each show a portion of the frame 302.

The bonder cap accommodating part 306 is formed in a shape of a bottomed tube that can accommodate the bonder cap 5. The bonder cap 5 is put over an edge of a wire bundle 4 to protect a portion where core wires of the wires are electrically connected.

The terminal-attached wire accommodating part 307 is formed in a shape of a tube and positioned adjacent to the bonder cap accommodating part 306. An edge forming an insertion port of the bonder cap accommodating part 306 projects beyond an edge forming an insertion port of the terminal-attached wire accommodating part 307.

The threading hole 309 is provided in the vicinity of the insertion port of the bonder cap accommodating part 306. The bundling tie 308 passing through the threading hole 309 is wound around a periphery of the wire bundle 4, as shown in FIG. 4, to prevent the bonder cap 5 from falling out of the bonder cap accommodating part 306.

CITATION LIST

Patent Literature

Patent Literature 1: JP 2004-88946 A

SUMMARY OF INVENTION

Technical Problem

However, the above described conventional frame 302 has various problems as follows.

The first problem is that since the edge forming the insertion port of the bonder cap accommodating part 306 projects beyond the edge forming the insertion port of the terminal-attached wire accommodating part 307, a terminal-attached wire is hard to be inserted into the terminal-attached wire accommodating part 307.

The second problem is that since the frame 302 has the threading hole 309, the shape of a mold for manufacturing the frame 302 becomes complicated. Also, since the bundling tie 308 is used for preventing the bonder cap 5 from falling out, the cost of components and the assembling man-hour undesirably increase.

To solve the second problem, the inventors of the present invention have found a method in which the bonder cap 5 is prevented from falling out by holding the cap 5 with a cover attached to the frame 302, instead with the threading hole 309 and the bundling tie 308. The method however cannot solve the first problem.

Lowering a wall of the bonder cap accommodating part 306 while holding the bonder cap 5 with the cover attached to the frame 302 allows easy insertion of the terminal-attached wire into the terminal-attached wire accommodating part 307. However, this in turn undesirably makes the bonder cap 5 easily fall out of the bonder cap accommodating part 306. As described above, it is not easy to solve the first and the second problems at the same time.

Thus, a first object of the present invention is to provide an electrical junction box which prevents the bonder cap from falling out of the bonder cap accommodating part without using the bundling tie, and a second object of the present invention is to provide an electrical junction box which allows a user to easily insert the terminal-attached wire into the terminal-attached wire accommodating part, as well as preventing the bonder cap from falling out of the bonder cap accommodating part without using the bundling tie.

Solution to Problem

In order to achieve the first object, the invention according to one aspect is an electrical junction box including a frame and a cover attached to the frame, the frame including a bonder cap accommodating part into which a bonder cap is press-fitted, the bonder cap being put over an edge of a wire bundle to protect a portion where core wires of the wires are electrically connected to each other, and a terminal-attached wire accommodating part into which a terminal-attached wire is inserted, the cover being attached to near insertion ports of the bonder cap accommodating part and the terminal-attached wire accommodating part. An edge forming the insertion port of the bonder cap accommodating part includes a low profile portion and a projecting portion projecting beyond the low profile portion. In a state where the cover is attached to the frame, a distance between the low profile portion and the cover is longer than the full length of the bonder cap, a distance between the most projected portion of the projecting portion and the cover is shorter than the full length of the bonder cap, and the wire bundle is bent toward the low profile portion.

In order to achieve the second object, the terminal-attached wire accommodating part is preferably adjacent to the low profile portion, and the low profile portion has the same height as that of an edge forming the insertion port of the terminal-attached wire accommodating part.

Advantageous Effects of Invention

According to the invention, the edge forming the insertion port of the bonder cap accommodating part includes the low profile portion and the projecting portion projecting beyond the low profile portion. In a state where the cover is attached to the frame, the distance between the low profile portion and the cover is longer than the full length of the bonder cap, the distance between the most projected portion of the projecting portion and the cover is shorter than the full length of the bonder cap, and the wire bundle is bent toward the low profile portion. Accordingly, if the bonder cap is about to fall out of the bonder cap accommodating part, elastic resilience of the bent wire bundle acts to tilt the bonder cap toward the projecting portion opposite to the low profile portion, so that the bonder cap is caught between a wall on the projecting portion side and the cover to be prevented from falling out. Thus, an electrical junction box which prevents a bonder cap from falling out of a bonder cap accommodating part without using a bundling tie is provided.

According to the invention, the terminal-attached wire accommodating part is adjacent to the low profile portion, and the low profile portion has the same height as that of the edge forming the insertion port of the terminal-attached wire accommodating part. Accordingly, an electrical junction box is provided which allows a user to easily insert a terminal-attached wire into a terminal-attached wire accommodating part, as well as preventing a bonder cap from falling out of a bonder cap accommodating part without using a bundling tie.

DESCRIPTION OF EMBODIMENTS

An "electrical junction box" according to an embodiment of the present invention will be described with reference to FIGS. 1 to 3. The "electrical junction box" is mounted on automobiles, and supplies power and transmits a signal to electronic equipment mounted on the automobiles. In the present invention, a junction block (also referred to as junction box), a fuse block (also referred to as fuse box), and a relay block (also referred to as relay box) are collectively referred to as electrical junction box hereinafter.

Figure 2:
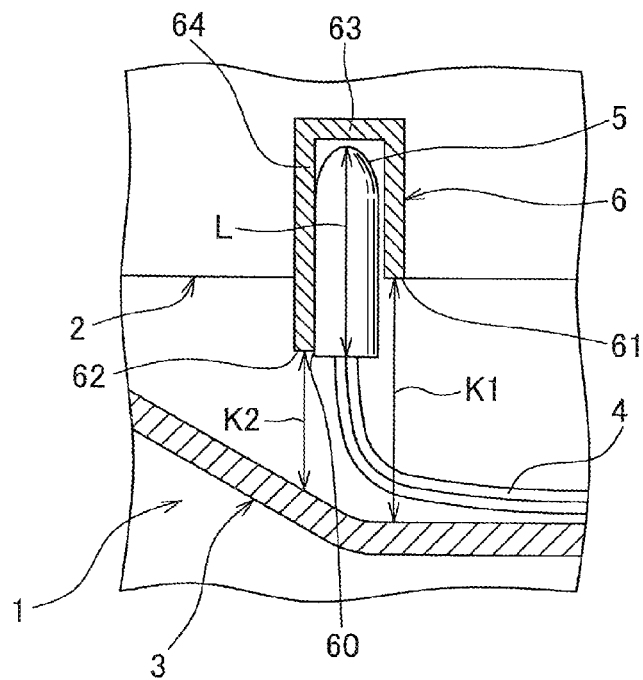
FIG. 2 is a cross sectional view of the frame shown in FIG. 1 with a bonder cap press-fitted into a bonder cap accommodating part of the frame and a cover attached to the frame.

The electrical junction box 1 includes a frame 2 made of synthetic resin and a cover 3 made of synthetic resin that is attached to the frame 2, as shown in FIG. 2.

Figure 1:
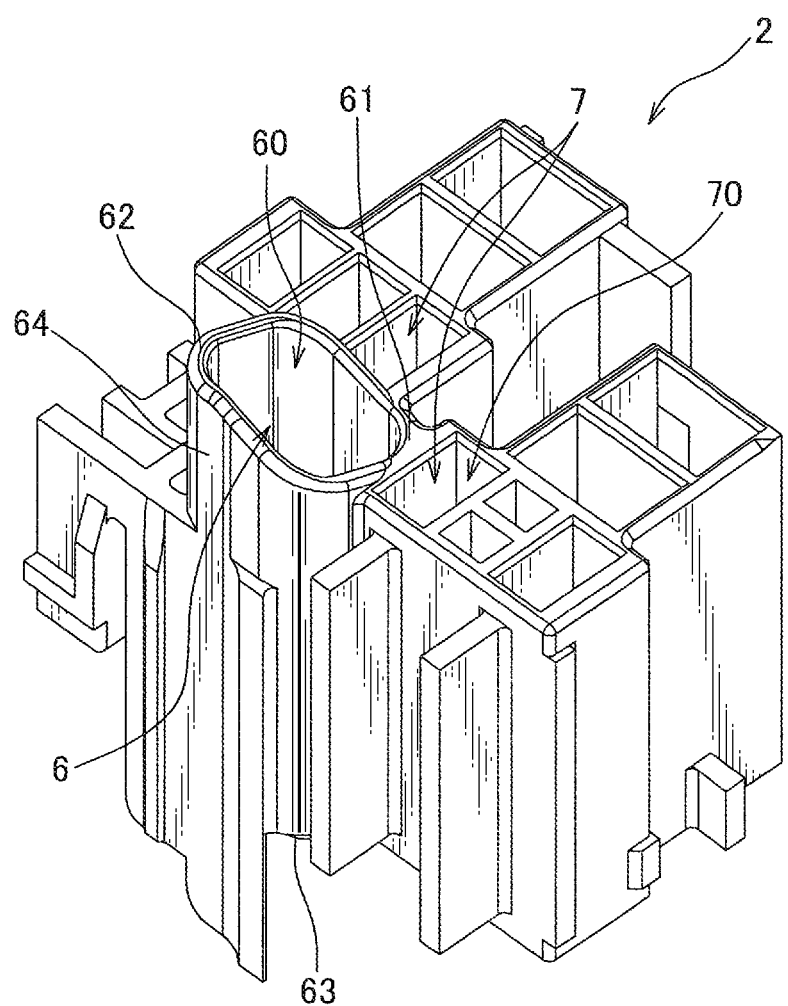
FIG. 1 is a perspective view of a frame used in an electrical junction box according to an embodiment of the present invention.

The frame 2 includes a bonder cap accommodating part 6 into which a bonder cap 5 is press-fitted and a plurality of terminal-attached wire accommodating parts 7 into which a terminal-attached wire is inserted, as shown in FIG. 1. FIG. 1 shows a portion of the frame 2.

The bonder cap accommodating part 6 is formed in a shape of a bottomed tube that can accommodate the bonder cap 5. The reference number 64 in FIGS. 1 and 2 indicates a peripheral wall forming the bonder cap accommodating part 6, the reference number 63 indicates a bottom wall, and the reference number 60 indicates an insertion port. An edge forming the insertion port 60 of the bonder cap accommodating part 6 includes a low profile portion 61 with the same height as that of an edge forming an insertion port 70 of the terminal-attached wire accommodating part 7, and a projecting portion 62 projecting beyond the low profile portion 61. That is, the edge forming the insertion port 70 of the terminal-attached wire accommodating part 7 has a uniform height, whereas the edge forming the insertion port 60 of the bonder cap accommodating part 6 is slanted.

The bonder cap 5 is put over an edge of a wire bundle 4 to protect a portion where core wires of the wires are electrically connected to each other and is made of synthetic resin. Each wire is a coated wire with the insulating coating removed at an edge to expose a core wire. The core wires of the wires are electrically connected to each other such as by welding. The bonder cap 5 covers the portion where the core wires are electrically connected to each other for waterproofing and insulation.

The terminal-attached wire accommodating part 7 is formed in a shape of a tube. Among the terminal-attached wire accommodating parts 7, the one positioned adjacent to the bonder cap accommodating part 6 is adjacent to the low profile portion 61 of the bonder cap accommodating part 6. As described above, the low profile portion 61 of the bonder cap accommodating part 6 has the same height as that of the edge forming the insertion port 70 of the adjacent terminal-attached wire accommodating part 7.

Although all terminal-attached wire accommodating parts 7 have the same height in the present embodiment, the terminal-attached wire accommodating parts 7 not adjacent to the bonder cap accommodating part 6 may have the edges projecting beyond the low profile portion 61.

As shown in FIG. 2, the cover 3 is attached to the bonder cap accommodating part 6 and the terminal-attached wire accommodating part 7 near the insertion ports 60 and 70 thereof. In a state where the cover 3 is attached to the frame 2, a distance K1 between the low profile portion 61 and the cover 3 is longer than the full length L of the bonder cap 5, and a distance K2 between the most projected portion of the projecting portion 62 and the cover 3 is shorter than the full length L of the bonder cap 5. The wire bundle 4 outside the bonder cap accommodating part 6 is bent toward the low profile portion 61.

Figure 3:
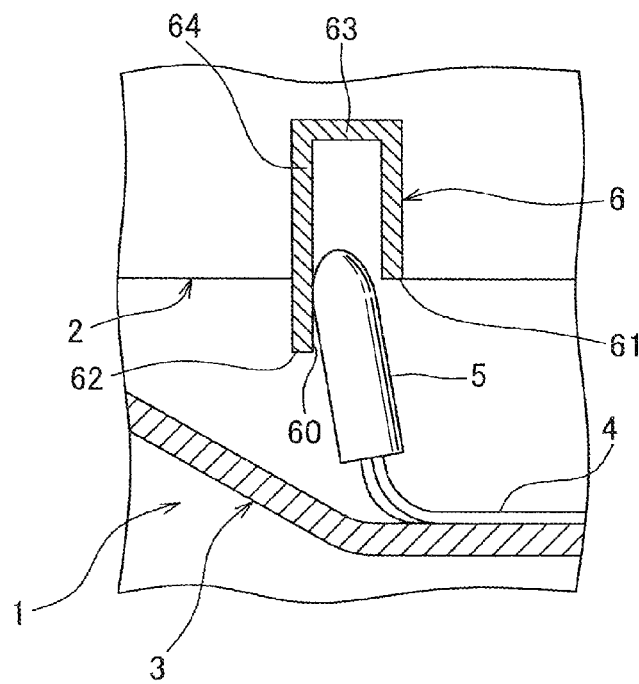
FIG. 3 is a view for explaining the operation and effect of the electrical junction box shown in FIG. 2.
Figure 4:
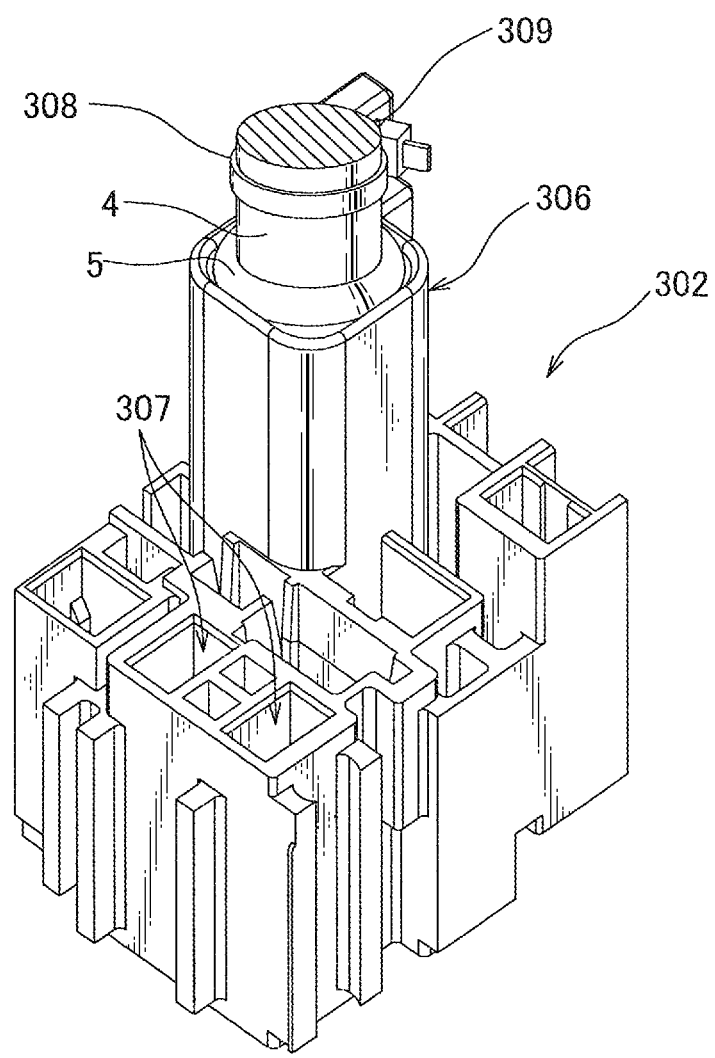
FIG. 4 is a perspective view of a frame used in conventional electrical junction boxes with a bonder cap press-fitted into a bonder cap accommodating part of the frame.
Figure 5:
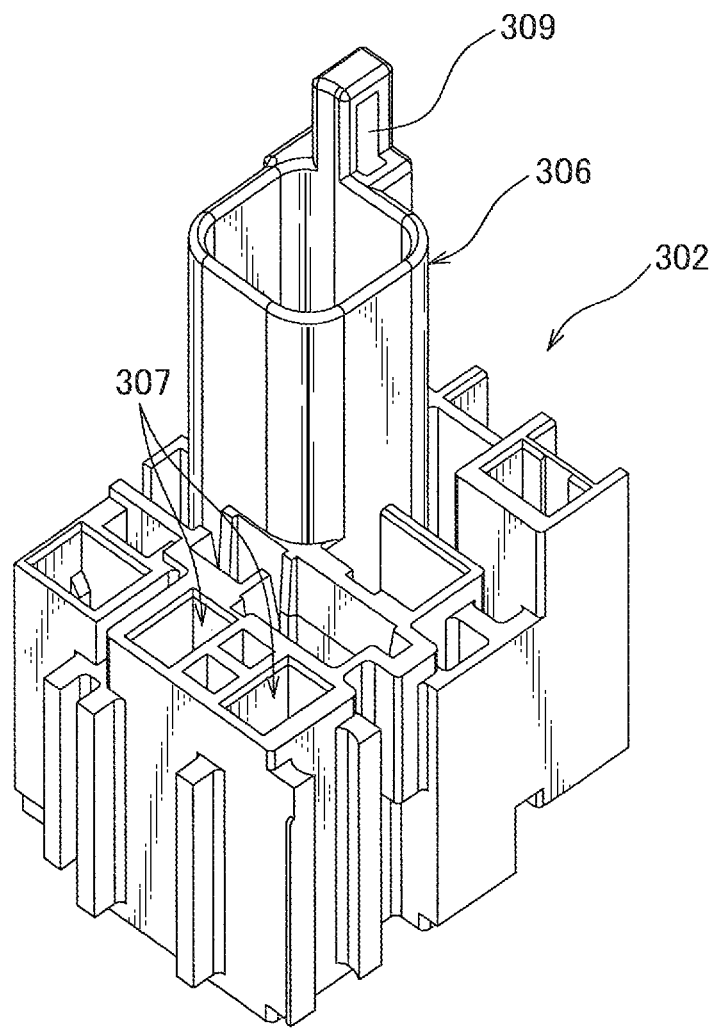
FIG. 5 is a perspective view only showing the frame shown in FIG. 4.

According to the electrical junction box 1 with the above configuration, if the bonder cap 5 is about to fall out of the bonder cap accommodating part 6 as shown in FIG. 3, elastic resilience of the bent wire bundle 4 acts to tilt the bonder cap 5 toward the projecting portion 62 opposite to the low profile portion 61, so that the bonder cap 5 is caught between the projecting portion 62 near the peripheral wall 64 and the cover 3 to be prevented from falling out. Accordingly, the bonder cap 5 is prevented from falling out of the bonder cap accommodating part 6 without using a bundling tie.

Also, according to the electrical junction box 1, the terminal-attached wire accommodating part 7 positioned adjacent to the bonder cap accommodating part 6 is adjacent to the low profile portion 61 of the bonder cap accommodating part 6, so that the terminal-attached wire can be easily inserted into the terminal-attached wire accommodating part 7.

It should be appreciated that the above embodiment only shows a representative example of the present invention. The present invention is not limited to the embodiment. That is, various modifications may be made within the range of the gist of the present invention.

REFERENCE SIGNS LIST

1 Electrical junction part
2 Frame

3 Cover
4 Wire bundle
5 Bonder cap
6 Bonder cap accommodating part
7 Terminal-attached wire accommodating part
60, 70 Insertion port
61 Low profile portion
62 Projecting portion

The invention claimed is:

1. An electrical junction box comprising a frame and a cover attached to the frame,
the frame including:
 a bonder cap accommodating part into which a bonder cap is press-fitted, the bonder cap being put over an edge of a wire bundle to protect a portion where core wires of the wires are electrically connected to each other; and
 a terminal-attached wire accommodating part into which a terminal-attached wire is inserted,
the cover being attached to the bonder cap accommodating part and the terminal-attached wire accommodating part near insertion ports thereof, wherein
an edge forming the insertion port of the bonder cap accommodating part includes a low profile portion and a projecting portion projecting beyond the low profile portion, and
in a state where the cover is attached to the frame, a distance between the low profile portion and the cover is longer than a full length of the bonder cap, a distance between the most projected portion of the projecting portion and the cover is shorter than the full length of the bonder cap, and the wire bundle is bent toward the low profile portion.

2. The electrical junction box according to claim 1, wherein
the terminal-attached wire accommodating part is adjacent to the low profile portion, and
the low profile portion has a same height as that of an edge forming the insertion port of the terminal-attached wire accommodating part.

* * * * *